(12) United States Patent
Barone

(10) Patent No.: US 6,331,964 B1
(45) Date of Patent: Dec. 18, 2001

(54) MOTION DETECTORS AND OCCUPANCY SENSORS BASED IN DISPLACEMENT DETECTION

(76) Inventor: Stephen Barone, 56 Village Hill Dr., Dix Hills, NY (US) 11746

(*) Notice: Subject to any disclaimer, the term of this patent is extended or adjusted under 35 U.S.C. 154(b) by 0 days.

(21) Appl. No.: 09/415,940

(22) Filed: Oct. 8, 1999

Related U.S. Application Data

(63) Continuation of application No. PCT/US99/02811, filed on Feb. 9, 1999.
(60) Provisional application No. 60/074,149, filed on Feb. 9, 1998, and provisional application No. 60/097,873, filed on Aug. 25, 1998.

(51) Int. Cl.[7] ........................................... G01S 3/80
(52) U.S. Cl. ............................................... 367/128
(58) Field of Search .................................. 367/128, 124, 367/125, 126; 348/162, 163, 164; 342/27, 28

(56) References Cited

U.S. PATENT DOCUMENTS 5,915,332 * 6/1999 Young et al. ........................ 119/421

* cited by examiner

*Primary Examiner*—Daniel T. Pihulic
(74) *Attorney, Agent, or Firm*—Dilworth & Barrese

(57) ABSTRACT

A method and an apparatus is disclosed for controlling electrical loads as a function of displacement detection of objects within a monitored zone by utilizing the non-Doppler shifted component of an electromagnetic, acoustic, microwave, infrared, or optical field. In the case of an ultrasonic field, a transmitter generates an ultrasonic transmission frequency into a zone to be monitored. Information is extracted from the spatial and temporal variation of the amplitude and/or phase of the total ultrasonic field at the original (i.e. non-Doppler shifted) frequency of transmission. At a detection stage, after filtering all Doppler returns, the signal received from each of a plurality of receivers/transducers, if not already digital, is digitized and passed to a gate array, microprocessor, or similar processing means where amplitude and/or phase changes are demodulated to control one or more electrical loads, for example, lighting, alarms, A/C according to an embedded algorithm within the processor. These algorithms can process the input signal to self-calibrate the system, may be adaptive, and can incorporate learning by experience features. Artificial intelligence techniques employing expert systems incorporating certainty factors and/or fuzzy logic systems can be employed to construct truly intelligent sensors. Furthermore, any variants of this new type of detector can be combined with each other or with prior art motion detectors or occupancy sensors to form a multi-technology system which minimizes the deficiencies of any single technology.

23 Claims, 12 Drawing Sheets

MOTION DETECTORS AND OCCUPANCY SENSORS BASED IN DISPLACEMENT DETECTION

RELATED APPLICATIONS

This application is a continuation of PCT/US99/02811 filed Feb. 9, 1999 which claims priority to U.S. Provisional Application Nos. 60/074,149 and 60/097,873 filed Feb.9, 1998 and Aug. 25, 1998, respectively.

FIELD OF THE INVENTION

The present invention relates generally to active occupancy sensors and motion detectors, and more particularly to apparatus and methods directed to motion detection and occupancy sensing utilizing the non-Doppler shifted return signal.

BACKGROUND OF THE INVENTION

Present methods of motion and occupancy detection which utilize active microwave, infrared/optical, and acoustic/ultrasonic motion apparatus operate by transmitting an electromagnetic or acoustic wave into a region of interest, via one or more transmitters, which then reflect off of objects in the region of interest and are detected by one or more receivers. A Doppler shift of the reflected signals indicates the presence of movement within the region of interest.

Typical applications of motion and occupancy detection are described in U.S. Pat. Nos. 4,661,720, 5,189,393 and 5,640,143.

SUMMARY OF THE INVENTION

The present invention provides a method and apparatus for controlling an electrical load based upon occupancy and/or motion within a monitored zone. The invention may be generally described as follows: first an interrogation signal is transmitted at a pre-determined frequency into a zone to be monitored. The interrogation signal may be transmitted either continuously or at controllable sample intervals. The return signal is then processed, either as an analog signal or digitized, to provide an indication of motion within a space. Thereafter, at a decision stage, an electrical load is either energized, de-energized, or otherwise controlled as a function of the indication of motion within the space.

The occupancy signal may be generated either actively or passively or some combination thereof. Active generation of an occupancy signal include, for example, ultrasonic, optical, acoustic, and microwave signals. Passive generation of occupancy signals include, for example, passive infrared detectors that detect moving heat sources within a monitored zone.

In the preferred embodiment of the invention, a transmitted signal is generated at a fixed frequency. An array of receivers receive a return signal from the space whereby the receivers filter out (i.e. reject) all Doppler shifted frequency components in the return signal leaving only that portion of the return signal at the original frequency of transmission. The information contained in the detected signal can either be digitized and passed to a microprocessor where a corresponding control signal will be generated to activate, deactivate or otherwise control a load. Otherwise, the analog return signal is sent directly to a driver to control an electrical load.

When the return signal is detected by a receiver array, a feature of the invention is that object displacement is detectable by virtue of the change in pathlength from the displaced object to each element of the receiver array being different thereby resulting in a different amplitude and phase characteristic at each element of the receiver array.

When the return signal is detected by a single receiver, a second novel feature of the invention is that object displacement is detectable by virtue of distinguishing amplitude and/or phase differences of the return signal at controlled time intervals.

For a fuller understanding of the nature and advantages of the invention, reference should be made to the ensuing detailed description taken in conjunction with the accompanying drawings.

DETAILED DESCRIPTION OF THE PREFERRED EMBODIMENTS

General Description

Figure 1:
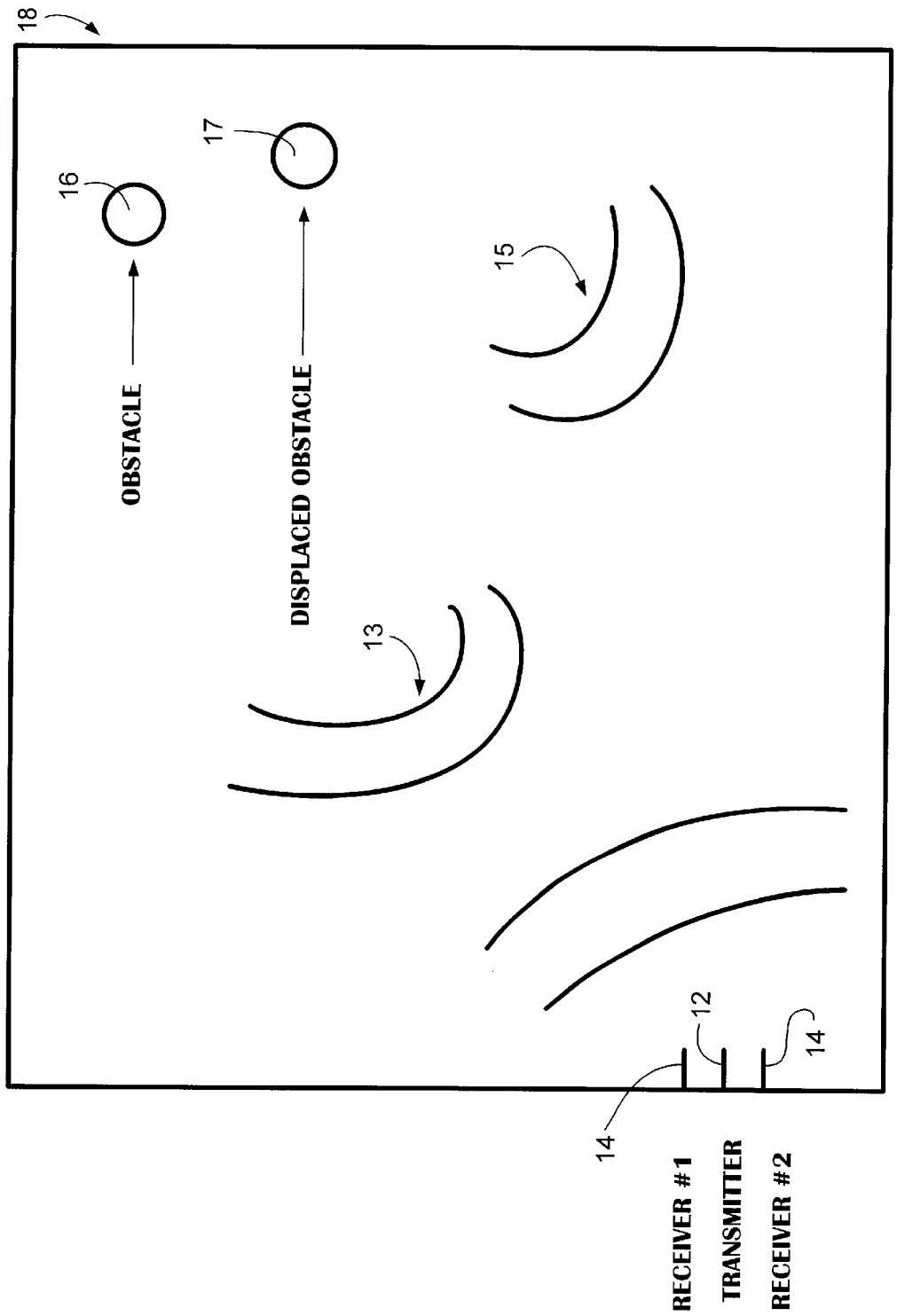
FIG. 1 depicts a monitored zone illustrating displacement detection of a single object in accordance with the present invention.

The displacement detection method of the present invention selectively processes the return signal at the original frequency of transmission in a detection or reception stage while ignoring or rejecting the Doppler shifted signal components.

The original transmission frequency component of the return signal provides unique information, not attainable from the return signal's Doppler shifted signal components about the instantaneous location of objects in a given region of space.

In operation, the location information from all stationary objects is preferably collected by an array of receiver/ transducers. If one of the stationary objects within a monitored zone is displaced in position, the return signal, at the original frequency of transmission, from the region of space previously occupied by the object is changed as well as the return signal from the region of space currently occupied by the displaced object. By processing the non-Doppler shifted component of the return signal a determination can be made regarding object movement by detecting the characteristic changes in the return signal at the original frequency of transmission.

In a typical application a sensing system will be deployed for a region of space to be monitored. The sensing system (e.g. receiver/transducer array) would comprise one or more receiver/transducer elements which receive, for example, reflected electromagnetic or acoustic waves at the original unshifted frequency of transmission from all stationary objects in the region under observation.

There are several different types of information that can be collected by the receiver/transducer array. A single receiver/transducer can be employed to measure continuously or at discrete time intervals, the amplitude and/or phase of the received signal at the original frequency of transmission. The results of these measurements may be correlated to yield decision criteria for activating, deactivating, or otherwise controlling electrical loads.

In the situation where a single array element is deployed, object displacement is detected as follows. If one of the objects in the space is displaced in position, the return signal, at the original transmitted frequency, from the region of space associated with the object's pre-displaced position is changed. Further, the return from the region of space containing the displaced object is also changed. Likewise, in the situation in which all objects remain fixed, the return signal does not undergo any variation. By processing the return signals the system can distinguish those time intervals during which the region under observation contains a moving object from those time intervals during which the region under observation does not contain a moving object.

An array of two or more receivers/transducers can be used in a similar manner to that described for a single element, or alternatively, the amplitude and/or phase of the received signals at a plurality of receivers/transducers may be measured at the same time. This measurement provides information about the spatial distribution of the amplitude and/or phase of the total field at the receiver array not attainable with a single receiver element. Multiple receiver element measurements can be performed at controlled time intervals or otherwise performed continuously. It is also possible to employ both of the previously described types of measurements in combination.

It should be appreciated that the displacement detection method of the present invention apply equally well irrespective of whether the monitoring system employs active microwave, infrared/optical, or acoustic/ultrasonics interrogation means. In addition, the different systems may be combined with each other or with other classes of systems in various ways in order to produce multi-technology systems. For example, it is within the scope of the present invention to combine any one or more of the technologies based on displacement detection with one or more of the prior art systems based on the Doppler shift and/or with one or more passive technologies in order to enable more sophisticated signal processing algorithms. For example, the combination of a passive infrared system with one of the implementations of the ultrasonic versions of the technology disclosed herein would allow the signal processing algorithm to suppress the undesirable features of each technology while optimizing the desirable features of each technology.

FIG. 1 is a general displacement detection system comprising a transmitter 12 which may operate by electromagnetic (i.e. microwave, infrared/optical) or by acoustic/ultrasonic means. The transmitter radiates a fixed frequency wave. The system further includes two receiver/transducers 14. It is within the scope of the present invention to use any number of receiver/transducers as elements of a receiver array. The receiver/transducers may be close together as shown or widely separated from each other and/or the transmitter. The transmitter and receivers are not required to be on the same surface. The amplitude and phase of the received signals at the transmitted frequency depend on the instantaneous location of objects in the region under observation at a particular point in time. FIG. 1 illustrates an object at an initial position and its associated signal return, along with the object displaced a finite distance at a later point in time, along with its associated signal return. It is apparent that the pathlength from the object in its original position to the receivers is different than the pathlength from the object in its displaced position to the receivers 14. Thus, the contribution of the object to the total signal at the original, unshifted frequency at each of the receivers has a different amplitude and phase for different locations of the object. That is, signals from displaced objects arrive at the receiving antennas/transducers with an amplitude and phase that is a function of that objects location in the region under observation. When signal returns from displaced objects are superimposed on signal returns from non-displaced objects, the total combined signal is amplitude and phase modulated.

The detection scheme of the present invention operates by filtering out or otherwise rejecting the unwanted Doppler shifted frequency components from each of the return signals and passing the filtered signals individually or in combination to detectors. The filtered signal contains only the amplitude and phase modulated signal at the original frequency of transmission. Square law detectors, for example, will respond to the time variation of the amplitudes of the return signals at the original unshifted transmitted frequency. This time variation is then correlated with the presence of moving objects in the region under observation. Greater sensitivity may be achieved by employing peak detectors instead of square law detectors and/or one or more stages of amplification immediately preceding the detectors. In an analog implementation, the amplified detected signals could be sent directly to a driver which activates, deactivates or otherwise controls a load. Alternatively, the information contained in the detected signals can be digitized and the digitized signals can be passed to a gate array or microcomputer or equivalent processing device. An embedded algorithm determines which signatures of the detected signals activate, deactivate or otherwise control a load (e.g. lighting systems, heating or air conditioning).

The present invention contemplates a number of signal processing techniques for making recommendations/decisions based on an analysis of the available signals. Relatively simple algorithms can be implemented on gate arrays, possibly programmable, or by employing a microprocessor. More complicated algorithms require the addition of memory i.e. the use of a microcontroller or microcomputer. Similarly, software solutions, well known in the art, can also be readily implemented and may include: 1) Boolean logic systems which may or may not incorporate a mechanism for handling incomplete and/or uncertain information e.g. a scoring system, certainty factors or fuzzy logic;

2) rule based expert systems based on Aristotelian logic which may or may not incorporate certainty factors based on Bayesian probability theory for the treatment of incomplete or uncertain information; 3) fuzzy logic systems; 4) artificial neural networks; 5) combinations of the preceding. It is a straightforward matter for those skilled in the art to implement these systems on a microcomputer, microprocessor or microcontroller with supplementary memory and other appropriate peripherals.

Figure 2:
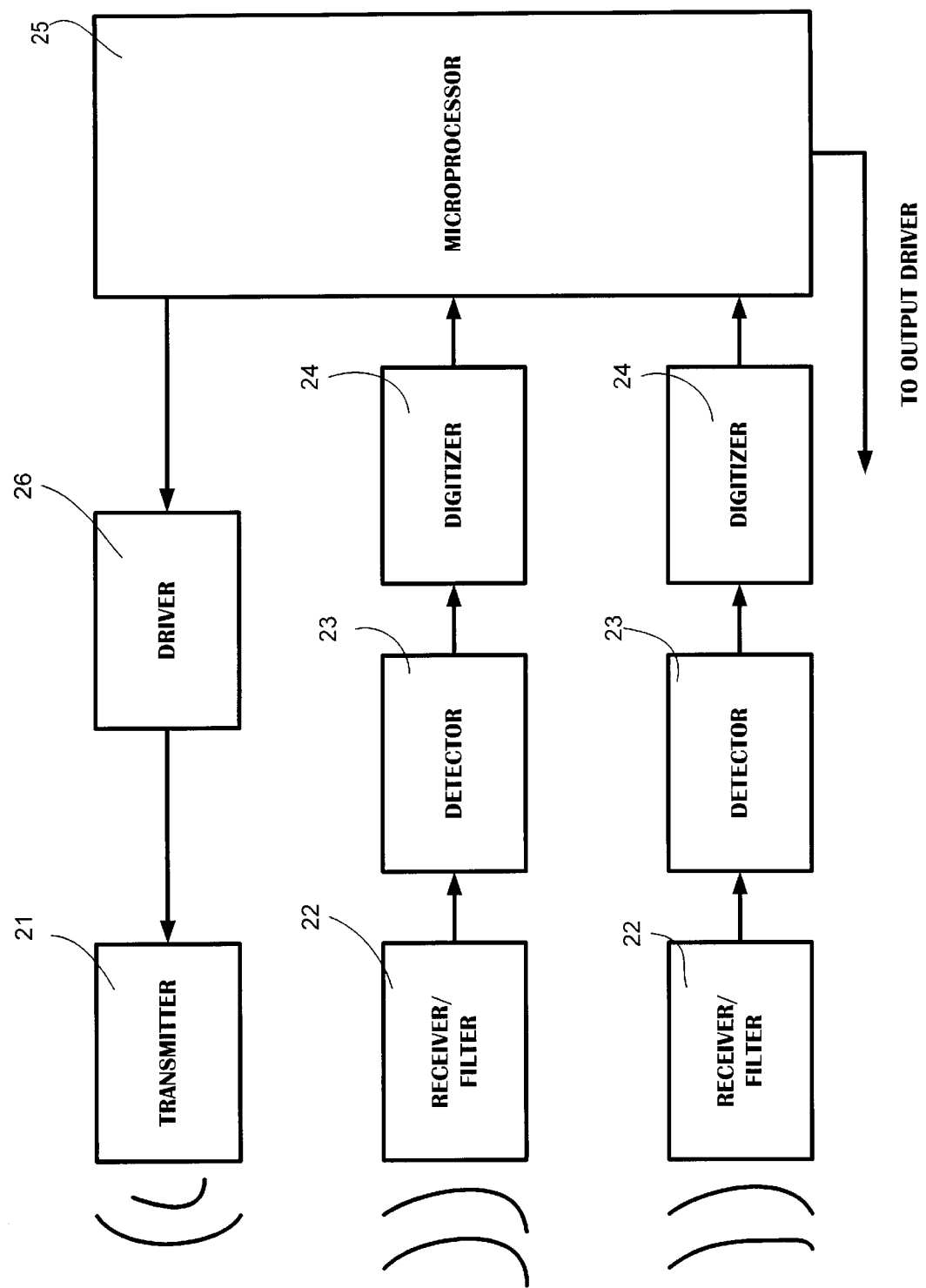
FIG. 2 is a block diagram of an exemplary embodiment of a displacement detection based motion detector/occupancy sensor according to the present invention.

FIG. 2 is a simplified schematic block diagram of a first embodiment of a motion detector/occupancy sensor based on displacement detection. FIG. 2 illustrates that the microcontroller 25 can also be employed to control the transmitter 21 by means of signals sent to the transmitter driver 26.

In general each of the signals from the receiving antennas/transducers or combinations of these signals is passed to an amplitude and/or phase demodulator. Amplitude demodulation techniques are well known in the prior art. Phase demodulation techniques employing a phase locked loop (PLL), however, are less well known.

Figure 3:
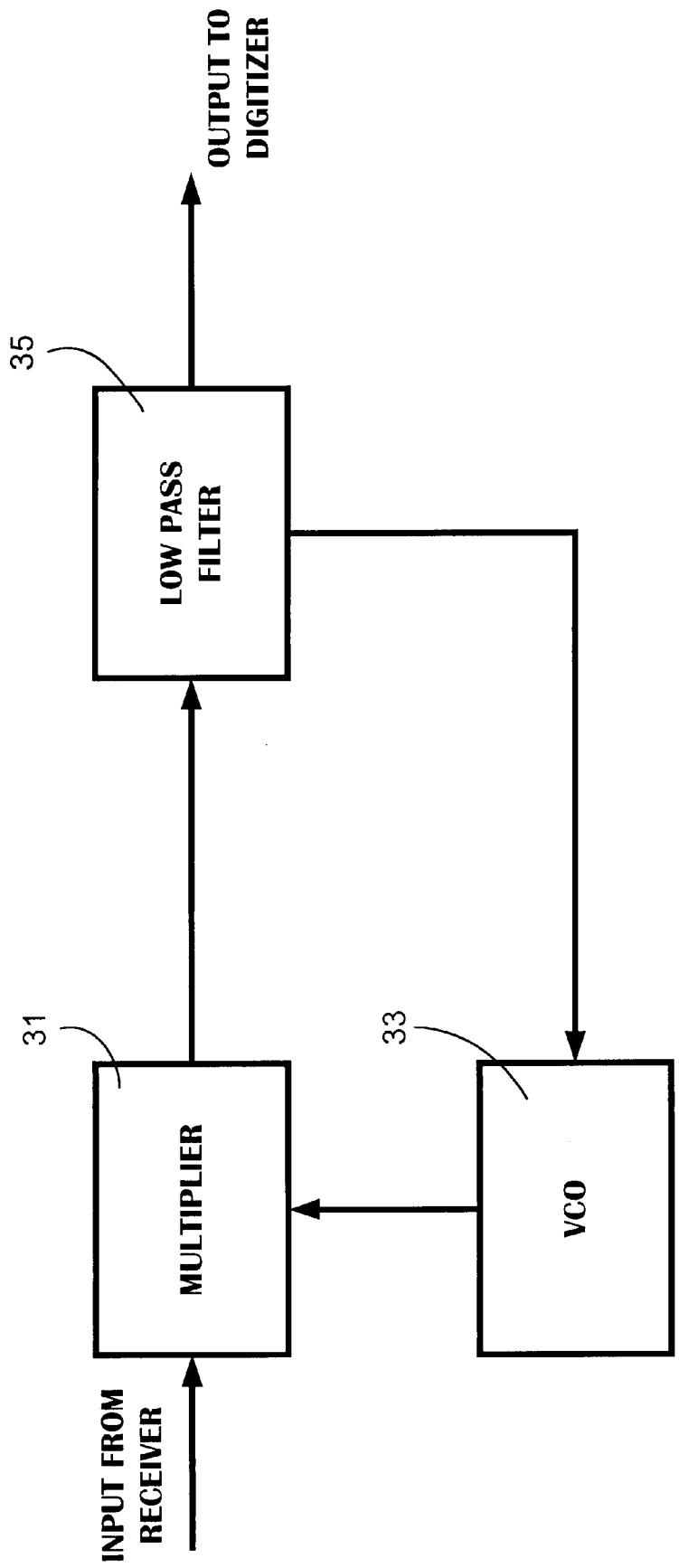
FIG. 3 is a general block diagram of a phase locked loop phase detector.

FIG. 3 illustrates a typical phase locked loop system. In FIG. 3. the output of a receiving antenna/transducer as well as the output from a voltage controlled oscillator (VCO) 33 are passed to a multiplier 31 the output of which is proportional to the product of the return signal from the receiving antenna/transducer and the output of the VCO 33. The VCO 33 is controlled by a feedback voltage which is derived from the low pass filter 35 which follows the multiplier. The input signal from the receiving antenna/transducer is a phase modulated carrier. The output of the multiplier consists of a low frequency part which contains the phase modulation information and a high frequency part at approximately twice the frequency of the carrier. With this detection scheme the filter immediately following the receiving antennas/transducers is redundant as the low pass filter can be employed to reject any Doppler shifted frequency components as well as the double frequency components. The filtered multiplier signal is used as a feedback signal to control the frequency of the VCO 33. The time variation of the feedback signal is a measure of the phase modulation of the received signal, at the original frequency of transmission, due to the displacement of objects in the region under observation. This block diagram can also be implemented digitally. Since the phase shift sensitivity of the phase locked loop does not depend on the carrier frequency, smaller phase shift variations of the returned signal can be measured by frequency multiplying the received signal before demodulation by the PLL.

Figure 4:
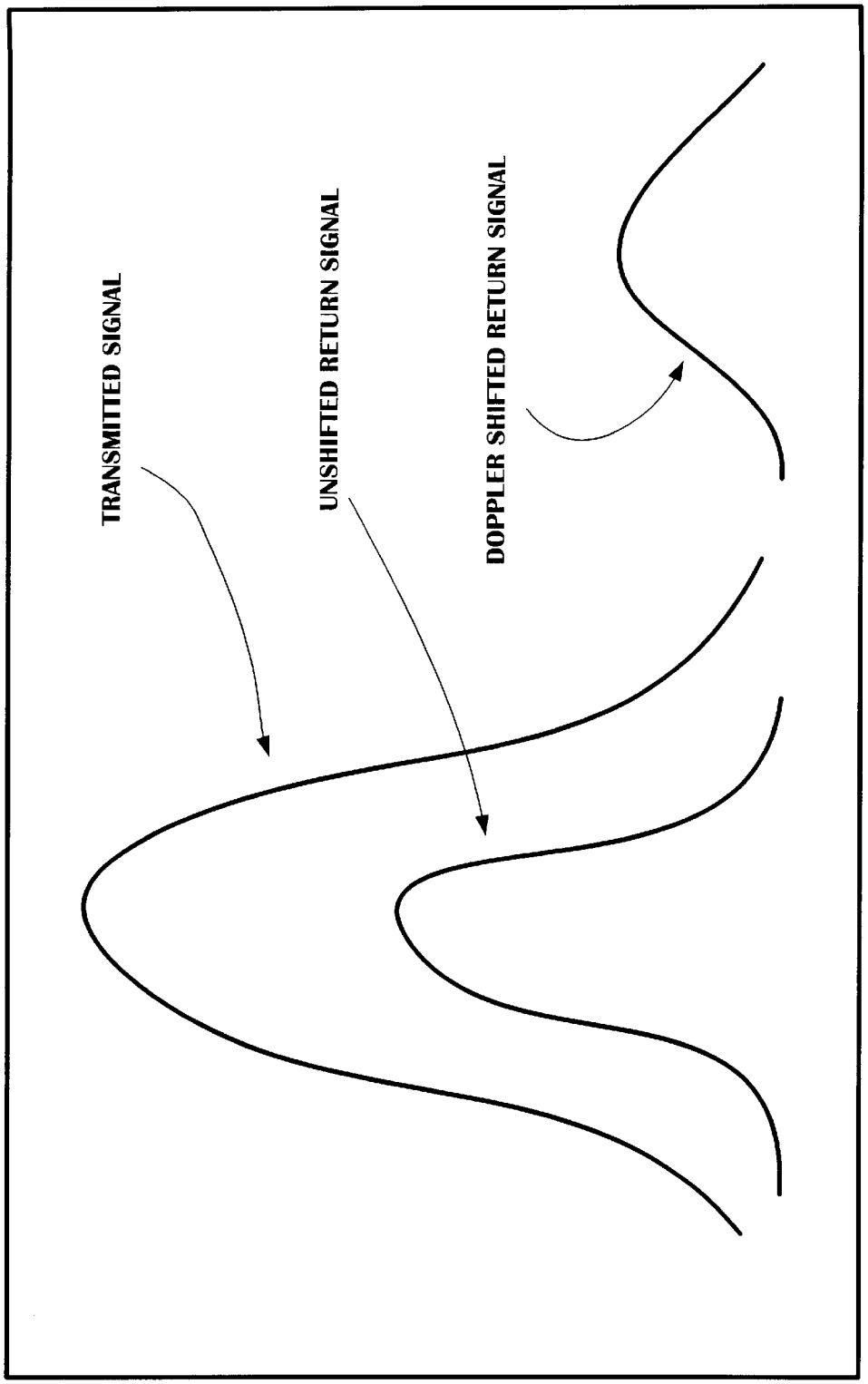
FIG. 4 is a graph illustrating the variation with frequency of the amplitude of the transmitted signal, the Doppler shifted return signal and the unshifted return signal.

The class of systems disclosed herein can also be understood in the frequency domain as illustrated in FIG. 4. In this figure the amplitude of the frequency spectrum of the transmitted signal is indicated as well as the amplitude of the frequency spectrum of the Doppler shifted return signal at a receiver/transducer and the amplitude of the return signal at the unshifted original transmitted frequency. According to prior art the Doppler shifted return signal is detected and employed as an indicator of motion in the region under observation. In accordance with the teachings of the present invention the Doppler shifted return signal is of no relevance as it is filtered out or otherwise rejected and the amplitude and/or phase of the return signals possibly sampled at the receivers/transducers and/or the spatial variation of the amplitude and/or phase of the unshifted return signal at the original frequency of transmission is employed as an indicator of the displacement of an object in the region under observation (i.e. the monitored zone).

Figure 5:
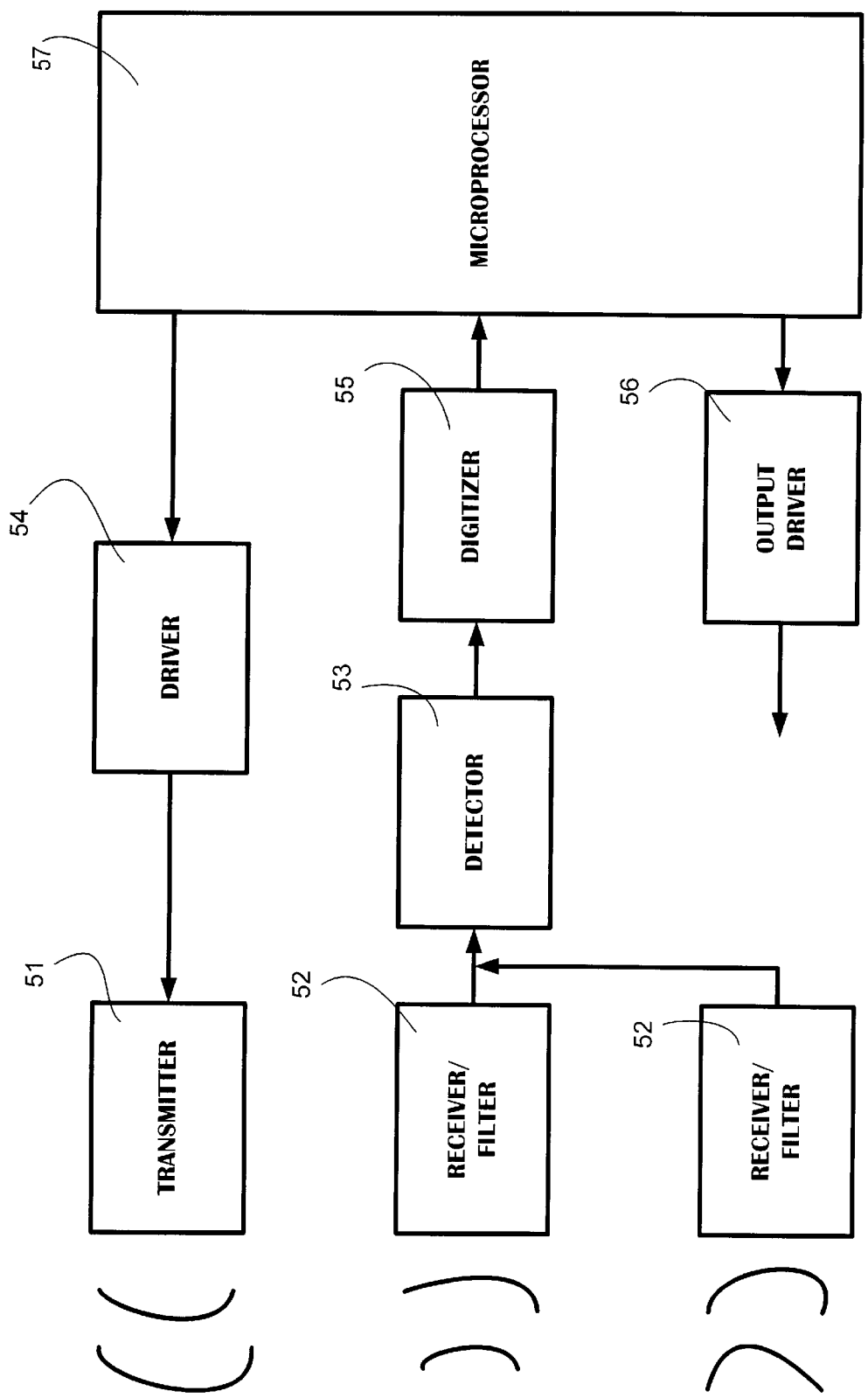
FIG. 5 is a block diagram of another exemplary embodiment of a displacement detection based motion detector/occupancy sensor according to the present invention.

FIG. 5 illustrates a second embodiment of the present invention whereby the sum of two of the filtered returns, at the original transmitted frequency is passed to a detector 53. The detector output depends on the amplitude of each of the return signals at the original transmitted frequency and also on their phase difference. The amplitudes of the return signals as well as their phase difference depends on the instantaneous location of objects in the region under observation and hence can be used as an indicator of changes in the location of objects in the region under observation. As previously noted sensitivity could be improved by employing a peak detector instead of a square law detector and/or one or more stages of amplification immediately preceding the detector.

In this system the filtered output signals from two or more receiving antennas/transducers 52 are added before being passed to a detector 53, for example, a phase locked loop (PLL). One advantage of adding the received signals before detection is that a receiving antenna/transducer array can be used to cover a larger region of observation with a single detector.

Figure 6:
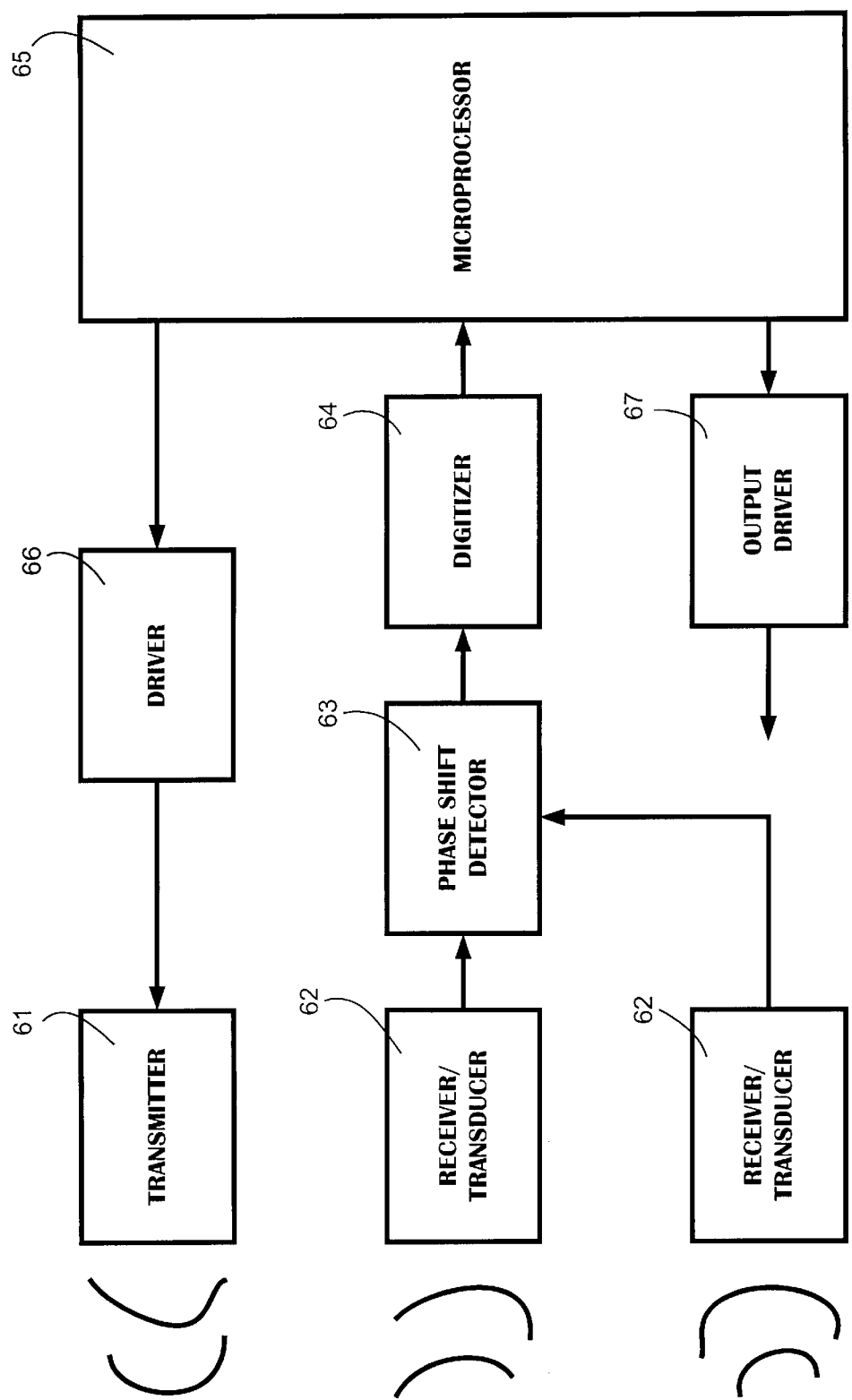
FIG. 6 is a block diagram of another exemplary embodiment of a displacement detection based motion detector/occupancy sensor according to the present invention.

FIG. 6 is a simplified schematic block diagram of a third embodiment of the present invention. A transmitter 61 radiates electromagnetic (microwave, infrared/optical) or acoustic/ultrasonic waves of a fixed frequency into the region under observation (not shown). Two receiver/transducers 62 receive return signals from objects in the region under observation. The two return signals contain the original unshifted frequency as well as any Doppler shifted frequency components. In accordance with the teachings of the present invention, the Doppler shifted frequency components are filtered out or otherwise rejected and the filtered signals are passed, possibly through amplifiers, to a phase shift detector 63 which records the phase difference between the unshifted (i.e. the original transmitted frequency) components of the two return signals. The signal may be processed with analog electronics or, preferably the phase difference may be digitized by a digitizer 64 and passed to a microcontroller 65 to generate the appropriate output signals according to an embedded algorithm.

Figure 7:
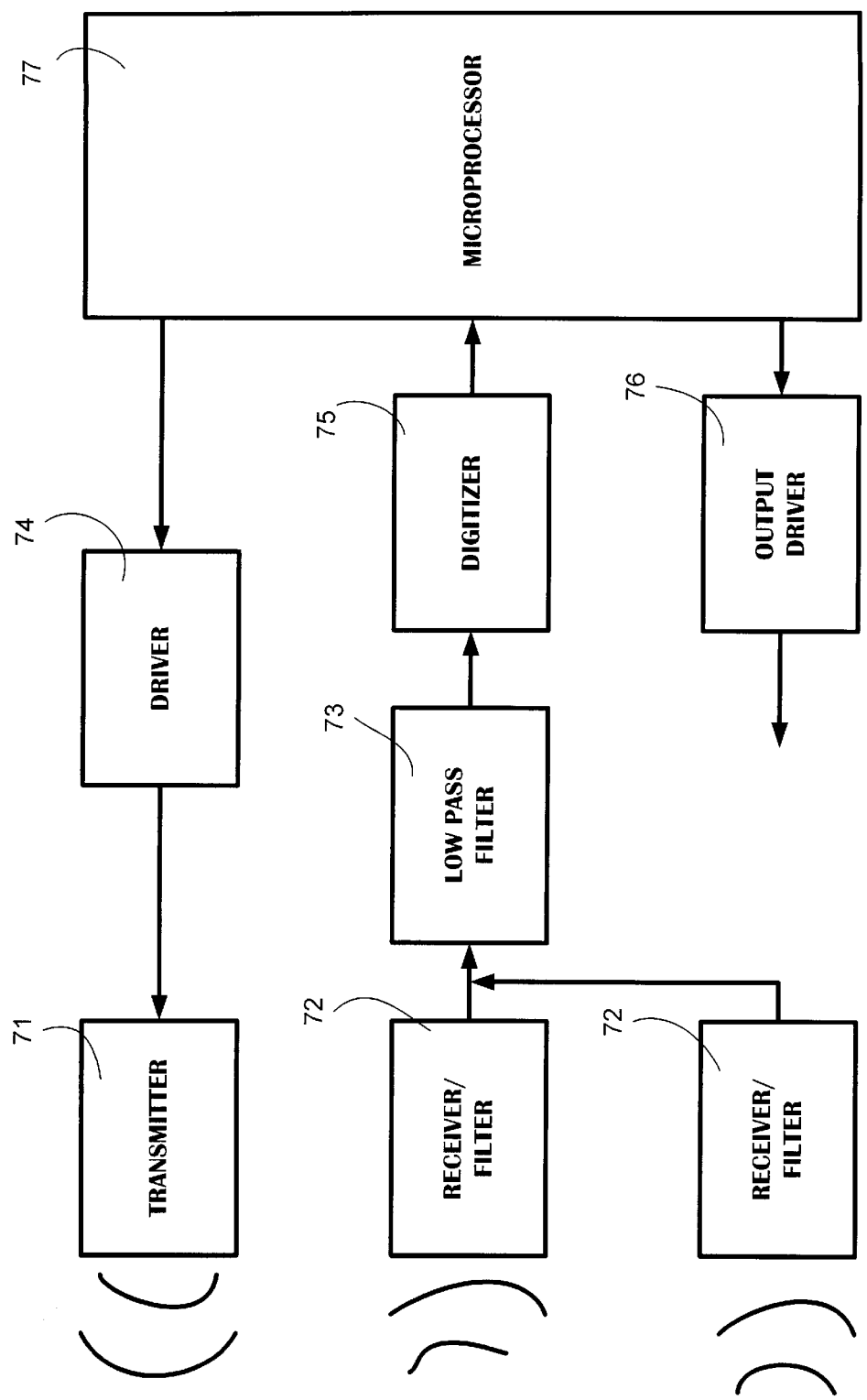
FIG. 7 is a block diagram of another exemplary embodiment of a displacement detection based motion detector/occupancy sensor according to the present invention.

FIG. 7 is a simplified schematic block diagram of a fourth embodiment of the present invention. FIG. 4 illustrates a sensitive detection scheme implemented as a phase locked loop. In this embodiment the phase difference between the filtered outputs of two receiving antennas/transducers is detected. The input return signals are multiplied together and the result is passed through to a low pass filter as shown in FIG. 7. The output of the low pass filter depends on the phase difference between the two input signals. In the present embodiment the Doppler filters immediately following the receiving antennas/transducers are again redundant as the low pass filter may be employed to reject any Doppler shifted frequency components in the return signals. The output of the low pass filter can be subjected to analog processing or digitized as shown by digitizer 75 and input to a microcontroller 77 which preferably contains an embedded algorithm.

In accordance with the present embodiment, an electromagnetic or acoustic pulse is transmitted at a fixed frequency, the amplitudes and/or phase differences of the fields at this frequency is measured at one or more receiver locations and the measurement is repeated at a later time. The difference between the two measurements is a measure of changes in the positions (i.e. the displacement) of objects in the region under observation during the time interval between the two measurements. If these measurements are recorded for a time period, motions which lead to a Doppler shift below the minimum detectable shift may be detectable since even slow motions may lead to measurable displacement after some time period.

Figure 8:
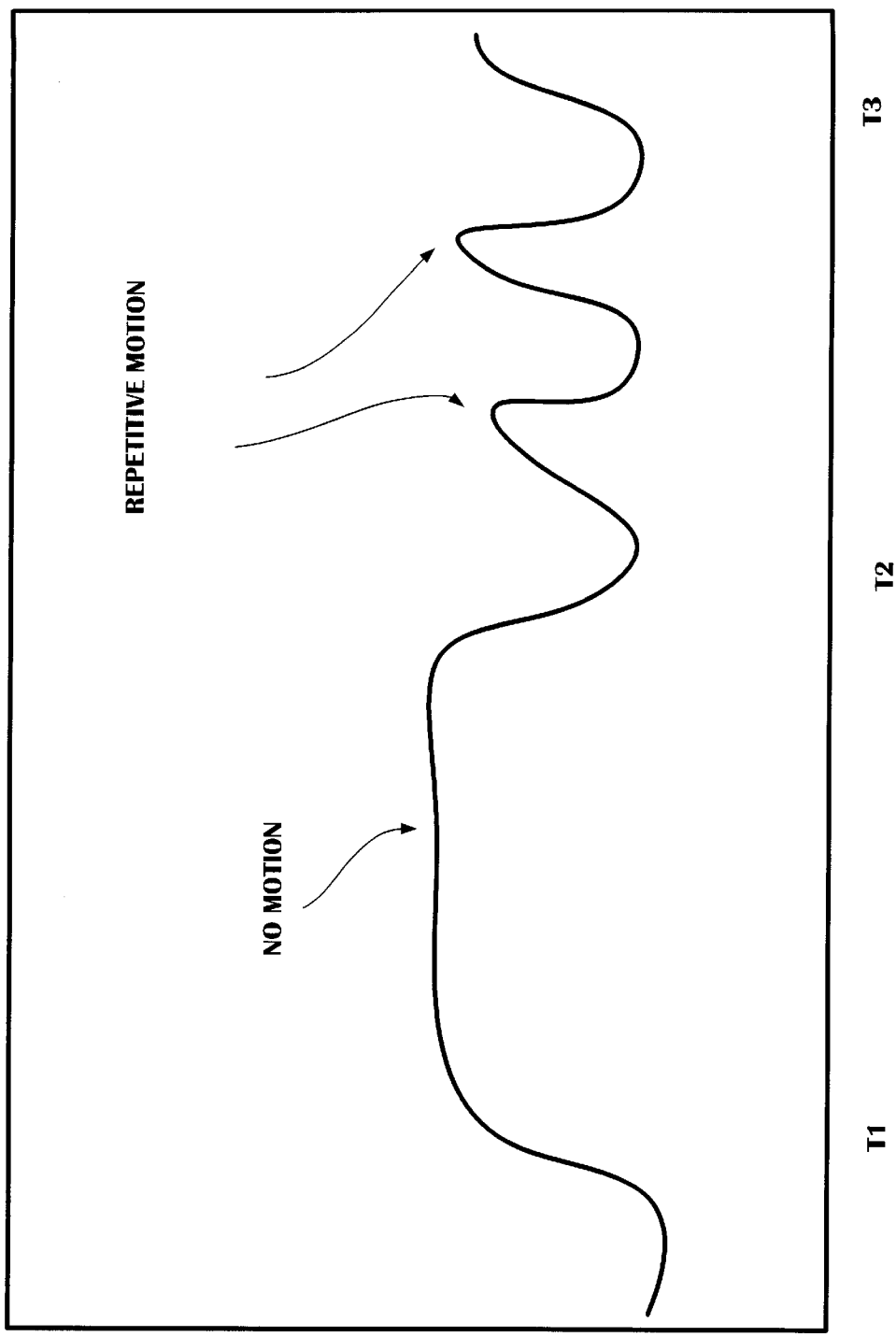
FIG. 8 is a timeline depicting the phase shift.

FIG. 8 illustrates a typical time history of the phase shift and/or amplitude variation of a continuously monitored received signal at one or more receivers. The time variation of the phase differences of the filtered signals, for example, is indicative of movement of an object within the field of observation. Immediately preceding the time T1 the phase difference is constant which is indicative of the absence of moving objects in the region under observation during this time interval. At the time T1 the phase difference changes from one constant value to another which is indicative of the movement of an object for a short time period followed by the absence of moving objects in the region under observation. Again the motion to be detected can be arbitrarily slow so long as the displacement is eventually large enough to be detectable. At the time T2 the phase difference changes which is again indicative of an object moving within the region under observation. Between the times T2 and T3 there is repetitive motion of an object within the region under observation.

In general, many receivers may be used to give increasingly detailed information about the electromagnetic or acoustic properties of the region under observation. It is also possible to group receivers in groups of three or more with correspondingly more complicated signal processing algorithms.

Figure 9:
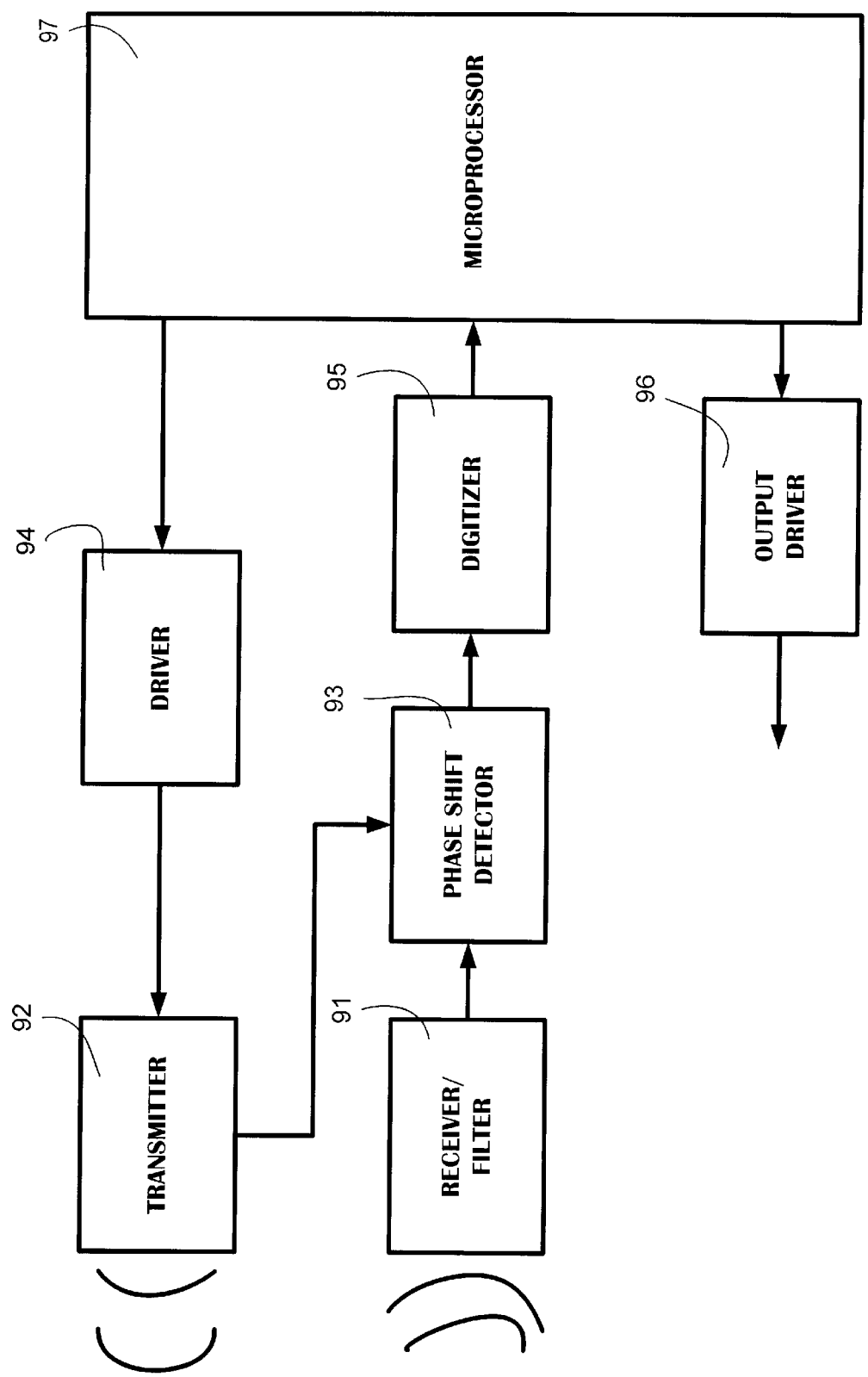
FIG. 9 is a block diagram of another exemplary embodiment of a displacement detection based motion detector/occupancy sensor according to the present invention.

FIG. 9 illustrates a fifth embodiment of the present invention. In the present embodiment the fixed frequency transmitter signal is substituted for one of the receiver signals i.e. a homodyne system. This is illustrated in FIG. 9 with a phase shift detector 93. Amplifiers may be used in front of the detector in an alternate embodiment (not shown). A homodyne system can be constructed with any of the detection schemes discussed in the instant application as well as others well known in the art.

Figure 10:
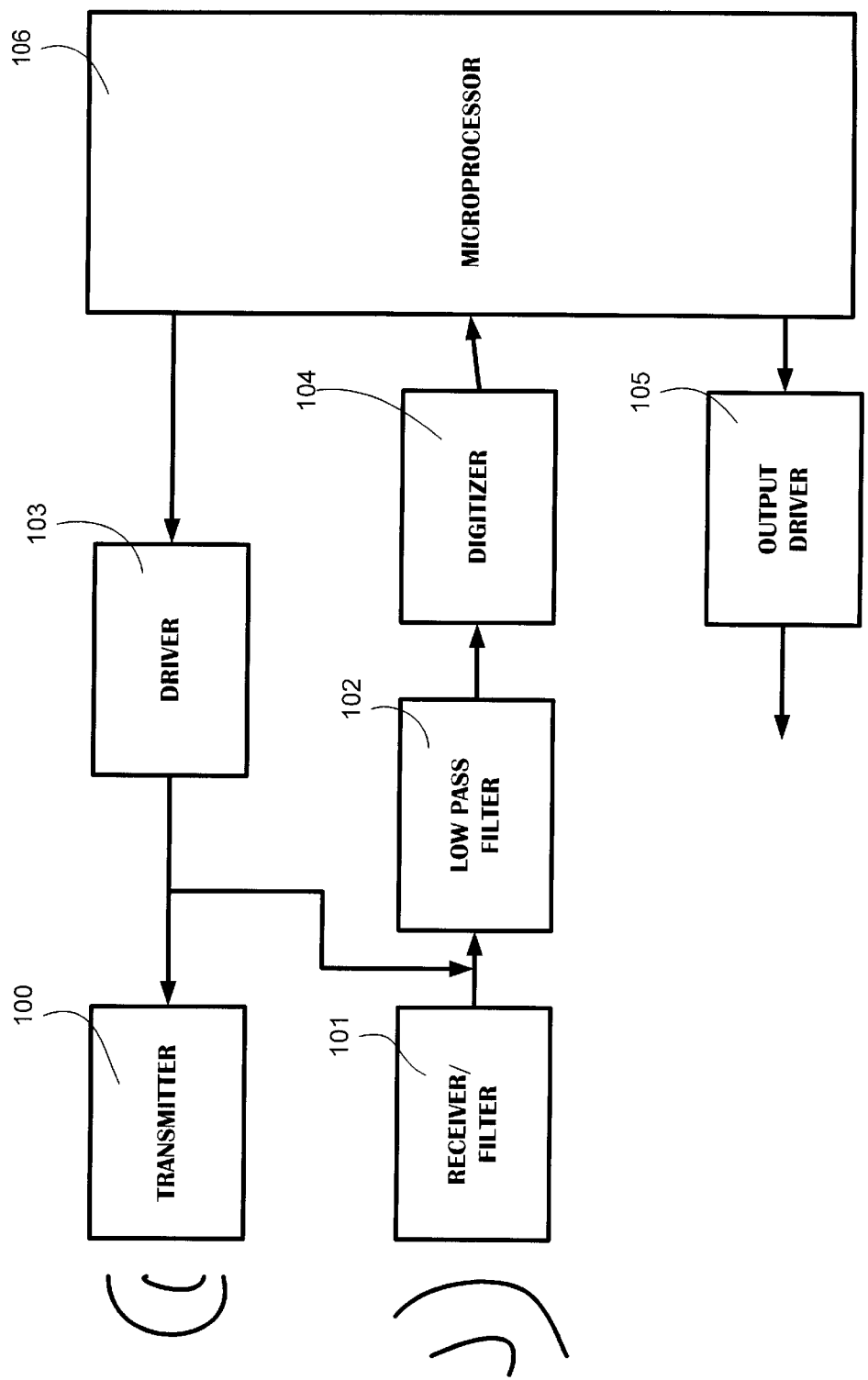
FIG. 10 is a block diagram of another exemplary embodiment of a displacement detection based motion detector/occupancy sensor according to the present invention.

FIG. 10 illustrates a sixth embodiment of the present invention. A homodyne system is shown in which the filtered return signal from a receiver antenna/transducer is compared to the transmitter signal in order to demodulate the amplitude and/or phase modulation due to the displacement of an object in the region under observation.

Figure 11:
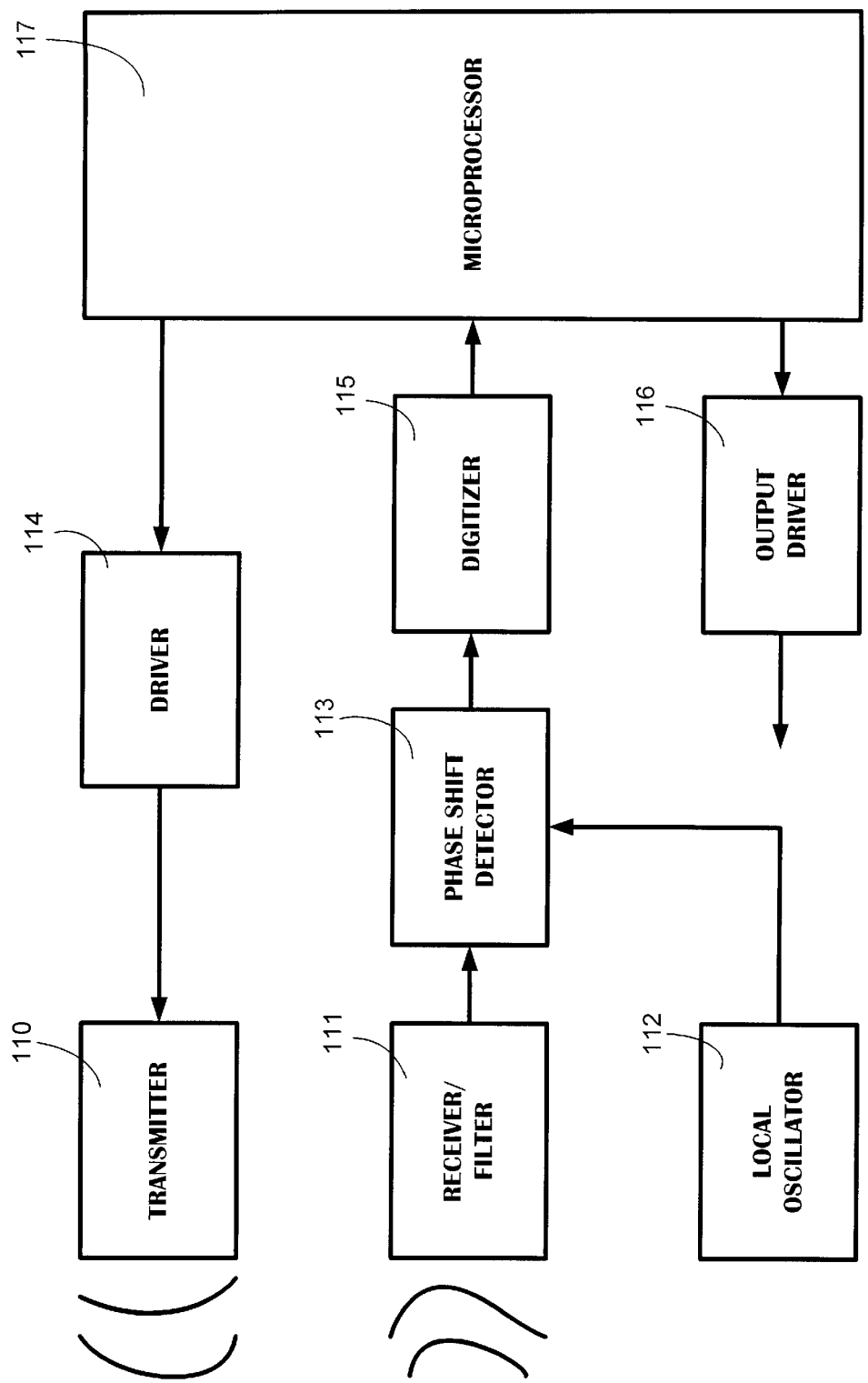
FIG. 11 is a block diagram of another exemplary embodiment of a displacement detection based motion detector/occupancy sensor according to the present invention.

Alternatively, a local oscillator different than the transmitter but at the fixed transmitter frequency can be substituted for one of the receiver signals, i.e. a heterodyne system. This is illustrated in FIG. 11 as a seventh embodiment of the present invention with a phase shift detector. Amplifiers may be used before the detector in an alternate embodiment (not shown). A heterodyne system can be constructed with any of the detection schemes discussed herein as well as others well known in the art. Homodyne and heterodyne systems put well known limits on the spectral and phase stability of the transmitter and/or local oscillator signals. The advantage of a homodyne/heterodyne system is that one of the signals can be much larger than the reflected signal so that the amplitude and phase dependent part of the output of a square law detector, for example, would be larger by the ratio of the transmitter/local oscillator signal to the reflected signal.

Figure 12:
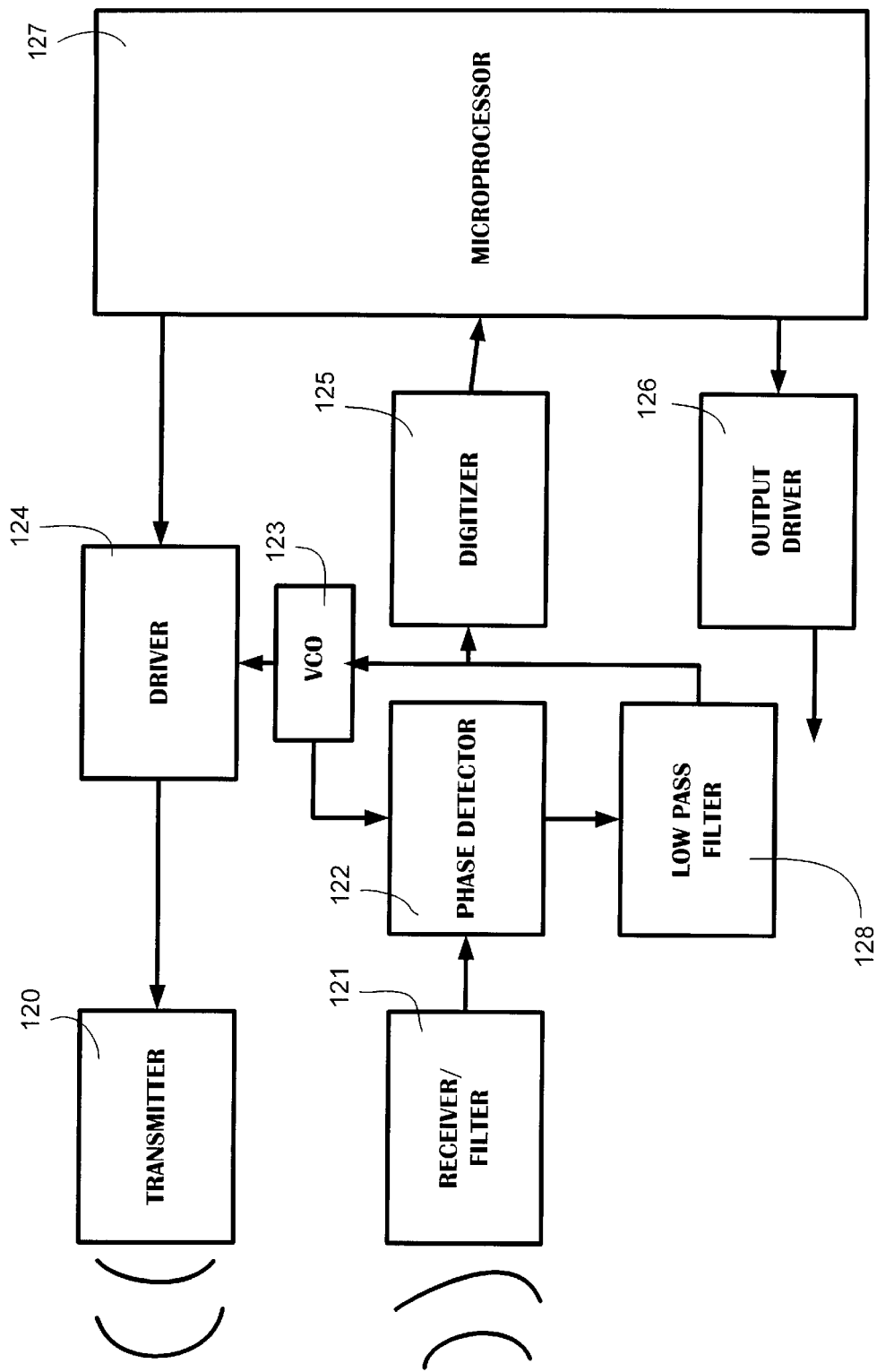
FIG. 12 is a block diagram of another exemplary embodiment of a displacement detection based motion detector/occupancy sensor according to the present invention.

FIG. 12 illustrates an eighth embodiment of the present invention which illustrates a block diagram of a phase detection system wherein the voltage controlled oscillator 123 of the phase locked loop is also used as a source for the transmitting antenna/transducer 120. This guarantees that the transmitted and received signals are at the same frequency. Again the low pass filter 128 rejects any Doppler shifted frequency components. The time variation of the output of the low pass filter is totally determined by the phase shift between the transmitted and returned signals at the original unshifted frequency of the transmitted signal. In addition to controlling the VCO 123 the digitized output of the low pass filter 128 is again passed to a microcontroller 127 which contains an embedded algorithm.

It is to be appreciated that a variety of specific electronic components and circuits can be employed to measure the amplitude and/or phase differences of interest as defined by the aforementioned embodiments and associated figures. The optimum choice in any particular application depends on engineering design details. All of the circuits described may be implemented digitally as well as in analog systems, with the only difference being that the digitizer preceding the microcontroller is removed and an A/D converter inserted at an appropriate point in each of the receiver/transducer branches. In particular, readily available lock-in amplifier circuitry can be used to measure the amplitude and/or phase of the received signals. This type of amplifier is commonly employed to measure the amplitude and phase of signals buried in noise. This is accomplished by acting as a narrow bandpass filter which rejects much of the noise while passing the signal to be measured. This is an obvious additional advantage in the present application. The noise rejection and accuracy of a lock-in amplifier can easily exceed the performance of a simple filter by orders of magnitude. The principle of lock-in amplifier demodulation can be implemented with either analog or digital components. Digital systems are generally more accurate than analog lock-in systems. In addition dual phase lock-in amplifier circuitry can be used to make measurements with two reference signals offset by 90 degrees. From these two measurements both the amplitude and phase of the incoming signal can be recovered. It is a straightforward matter for those skilled in the art to implement the block diagrams shown in the previously mentioned figures with lock-in amplifier circuitry.

Combined Systems

Systems which are designed and operated as discussed herein may be used as standalone units, in combination with other similar systems, in combination with Doppler based systems or in combination with passive systems. By combining two or more different technologies in one system it is possible to produce a composite system which minimizes the deficiencies of each individual system.

The large information gathering capability of these systems makes possible more sophisticated signal processing techniques. In general there will be several signals, possibly from different types of sensors, which must be processed in order to arrive at a recommendation/decision to activate, deactivate or otherwise control a load. The sensor signals can be processed by an analog system, a digital system or a mixed, partly analog partly digital system. One simple possibility is to use a gate array, possibly programmable, to combine the digitized input signals according to a fixed algorithm. A microcontroller or a microprocessor with their associated peripherals could be employed to process the sensor signals according to a more complicated embedded algorithm e.g. a knowledge based system that use a hybrid combination of observation based and functional reasoning. These systems could be decision trees, rule based expert systems incorporating certainty factors for the treatment of uncertain or incomplete information, fuzzy logic systems, artificial neural networks or combinations thereof.

This invention is not to be limited by the embodiments shown in the drawings and described in the description, which is given by way of example and not of limitation, but only in accordance with the scope of the appended claims.

I claim:

1. A hybrid based load controller comprising:
   a Doppler ultrasonic motion detector for measuring Doppler shifted components of an ultrasonic return signal from a monitored zone;
   a passive infrared motion detector for processing a passive infrared return signal received from said monitored zone;
   processing means for processing said Doppler shifted components of said ultrasonic return signal and said passive infrared signal to determine whether to generate a control signal, said processing means is selected from the group consisting of a rule-based expert system, a fuzzy logic system, and an artificial neural network; and
   means for generating activating and deactivating control signals for controlling at least one electrical load.

2. The passive infrared motion detector based load controller of claim 1, wherein the rule-based expert system is based on Aristotelian logic and incorporating certainty factors based on Bayesian probability theory for the treatment of uncertain or incomplete information.

3. The hybrid based load controller in accordance with claim 1, wherein said processing means is selected from the group of a microprocessor, a microcontroller, and a microcomputer.

4. A motion detector based load controller, comprising:
   at least one motion detector;
   means for processing a return signal from said detector according to an embedded algorithm to determine whether or not to generate an activating, deactivating or other control signals, said algorithm consisting of a rule based expert system based on Aristotelian logic and incorporating certainty factors based on Bayesian probability theory for the treatment of uncertain or incomplete information;
   means for generating a control signal to control an electrical load as a function of said processed return signal; and
   means for automatically controlling one or more loads in response to the control signal.

5. The load controller of claim 4 wherein the motion detector is a passive infrared motion detector and a Doppler ultrasonic detector.

6. A motion detector based load controller, comprising:
   at least one motion detector;
   means for processing a return signal from said detector according to an algorithm to determine whether to generate a control signal;
   said algorithm consisting of an artificial neural network;
   means for generating the control signal to control an electrical load as a function of said processed return signal; and
   means for automatically controlling one or more loads in response to the control signal.

7. The load controller of claim 6 wherein the motion detector is a Doppler ultrasonic motion detector and a passive infrared detector.

8. A motion detector based load controller, comprising:
   at least one motion detector;
   means for processing a return signal from said detector according to an algorithm to determine whether to generate a control signal;
   said algorithm is based on fuzzy logic;
   means for generating the control signal to control an electrical load as a function of said processed return signal; and
   means for automatically controlling one or more loads in response to the control signal.

9. The load controller of claim 8 wherein the motion detector is a Doppler ultrasonic motion detector and a passive infrared detector.

10. A method of controlling electrical loads, comprising the steps of:
    transmitting an ultrasonic wave into a monitored zone;
    receiving an ultrasonic return signal from said monitored zone responsive to said transmission of said ultrasonic wave;
    processing said ultrasonic return signal in accordance with a rule based expert system based on Aristotelian logic incorporating certainty factors based on Bayesian probability theory for the treatment of uncertain or incomplete information; and;
    generating at least one control signal from said processed ultrasonic return signal for controlling at least one electrical load.

11. A method of controlling electrical loads, comprising the steps of:
    generating an interrogation signal into a monitored zone thereby forming a steady-state field in said monitored zone;
    measuring a parameter selected from the group consisting of amplitude and phase of a non-Doppler shifted part of the steady-state field at each element of an array of one or more receivers to provide one or more active response signals indicative of the displacement of an object in said space;
    measuring a passive infrared motion signal from said monitored zone to provide one or more passive response signals indicative of the displacement of an object in said space;
    generating control signals for electrical loads as a function of said active and passive response signals; and
    automatically controlling one or more electrical loads in response to said control signals.

12. A displacement detector-based load controller for controlling electrical loads as a function of the occupancy pattern of a space, the controller comprising:
    a transmitter generating an ultrasonic field within said space;
    means for generating a signal indicative of the displacement of an object in said space by measuring a characteristic selected from the group consisting of amplitude and phase of a non-Doppler shifted part of the ultrasonic field; and
    a microprocessor for automatically controlling one or more electrical loads in response to said signal, microprocessor processing signals according to a rule-based expert system based on Aristotelian logic and incorporating certainty factors based on Bayesian probability theory for the treatment of uncertain or incomplete information embedded in memory associated with the microprocessor.

13. A displacement detector-based load controller for controlling electrical loads as a function of the occupancy pattern of a space, the controller comprising:
    a transmitter generating an ultrasonic field within said space;
    means for generating a signal indicative of the displacement of an object in said space by measuring a characteristic selected from the group consisting of amplitude and phase of a non-Doppler shifted part of the ultrasonic field; and
    a fuzzy logic system for automatically controlling one or more electrical loads in response to said signal.

14. A displacement detector-based load controller for controlling electrical loads as a function of the occupancy pattern of a space, the controller comprising:

a transmitter generating an ultrasonic field within said space;

means for generating a signal indicative of the displacement of an object in said space by measuring a characteristic selected from the group consisting of amplitude and phase of a non-Doppler shifted part of the ultrasonic field; and an artificial neural network for automatically controlling one or more electrical loads in response to said signal.

15. A displacement detector based load controller comprising:

a transmitter providing an interrogation signal into a monitored zone, the interrogation signal interacting with objects in the monitored zone whereby a return signal is generated;

a receiver detecting at least one parameter of a non-Doppler shifted component of said return signal; and a gate array for processing the non-Doppler shifted component of the return signal and generating a control signal for controlling at least one electrical load.

16. A displacement detector based load controller comprising:

a transmitter providing an interrogation signal into a monitored zone, the interrogation signal interacting with objects in the monitored zone whereby a return signal is generated;

a first receiver element for receiving and filtering at least one parameter of a non-Doppler shifted component of said return signal thereby providing a first detector input;

said second receiver element for receiving and filtering said at least one parameter of a non-Doppler shifted component of said return signal thereby providing a second detector input;

said first and second detector inputs being added to generate a result to be provided as input to said detector, said detector generating a detector output that is a function of the amplitude and phase of the non-Doppler shifted component of said first and second detector inputs; and processing means for processing the non-Doppler shifted component of the return signal and generating a control signal for controlling at least one electrical load;

said detector output being provided as an input to said processing means.

17. A displacement detector based load controller comprising:

a transmitter providing an interrogation signal into a monitored zone, the interrogation signal interacting with objects in the monitored zone whereby a return signal is generated;

a first receiver element for receiving and filtering at least one parameter of a non-Doppler shifted component of said return signal thereby providing a first phase-shift detector input; and a second receiver element for receiving and filtering said at least one parameter of a non-Doppler shifted component of said return signal thereby providing a second phase-shift detector input;

processing means for processing the non-Doppler shifted component of the return signal and generating a control signal for controlling at least one electrical load; and a phase shift detector for detecting a phase difference between said first phase-shift detector input and second phase-shift detector input, said phase difference being provided as input to said processing means.

18. A displacement detector based load controller comprising:

a transmitter providing an interrogation signal into a monitored zone, the interrogation signal interacting with objects in the monitored zone whereby a return signal is generated;

a first receiver element for receiving and filtering at least one parameter of a non-Doppler shifted component of said return signal thereby providing a first low-pass filter input;

a second receiver element for receiving and filtering said at least one parameter of a non-Doppler shifted component of said return signal thereby providing a second low-pass filter input;

a low-pass filter for detecting a phase difference between said first low-pass filter input and said second low-pass filter input; and processing means for processing the non-Doppler shifted component of the return signal and generating a control signal for controlling at least one electrical load;

said phase-difference being provided as input to said processing means.

19. A passive infrared motion detector based load controller comprising:

a passive infrared motion detector;

processing means for processing a signal from said detector to determine whether to generate a control signal, said processing means is selected from the group consisting of a rule-based expert system, a fuzzy logic system, and an artificial neural network; and means for controlling at least one electrical load in response to said control signal.

20. The passive infrared motion detector based load controller of claim 19, wherein the rule-based expert system is based on Aristotelian logic and incorporating certainty factors based on Bayesian probability theory for the treatment of uncertain or incomplete information.

21. The passive infrared motion detector based load controller in accordance with claim 19, wherein said processing means is selected from the group consisting of a microprocessor, a microcontroller, and a microcomputer.

22. A Doppler ultrasonic motion detector based load controller comprising:

at least one Doppler ultrasonic motion detector for measuring Doppler shifted components of an ultrasonic return signal;

processing means for processing said Doppler shifted components of said ultrasonic return signal from said detector to determine whether to generate a control signal, said processing means is selected from the group consisting of a rule-based expert system, a fuzzy logic system, and an artificial neural network; and means for generating activating and deactivating control signals for controlling at least one electrical load.

23. The Doppler ultrasonic motion based load controller in accordance with claim 22, wherein said processing means is selected from the group of a microprocessor, a microcontroller, and a microcomputer.

* * * * *